(12) United States Patent
Saini et al.

(10) Patent No.: US 7,921,912 B2
(45) Date of Patent: *Apr. 12, 2011

(54) NON-ACID ACIDIZING METHODS AND COMPOSITIONS

(75) Inventors: Rajesh K. Saini, Duncan, OK (US); Bradley L. Todd, Duncan, OK (US); David E. McMechan, Duncan, OK (US); Thomas D. Welton, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/502,284

(22) Filed: Aug. 10, 2006

(65) Prior Publication Data

US 2008/0035341 A1 Feb. 14, 2008

(51) Int. Cl.
*E21B 43/25* (2006.01)

(52) U.S. Cl. .................................... 166/300; 166/305.1

(58) Field of Classification Search ....................... None
See application file for complete search history.

(56) References Cited

U.S. PATENT DOCUMENTS

| | | | |
|---|---|---|---|
| 4,466,893 A | 8/1984 | Dill | |
| 4,552,672 A | 11/1985 | Walker | |
| 5,082,056 A | 1/1992 | Tackett | |
| 5,366,643 A | 11/1994 | Walker | |
| 5,678,632 A * | 10/1997 | Moses et al. | 166/307 |
| 6,488,091 B1 | 12/2002 | Weaver et al. | |
| 6,702,023 B1 * | 3/2004 | Harris et al. | 166/307 |
| 6,805,198 B2 | 10/2004 | Huang et al. | |
| 6,877,563 B2 | 4/2005 | Todd | |
| 6,929,070 B2 | 8/2005 | Fu et al. | |
| 7,021,383 B2 | 4/2006 | Todd | |
| 7,094,736 B2 * | 8/2006 | Jones et al. | 507/103 |
| 7,455,112 B2 * | 11/2008 | Moorehead et al. | 166/307 |
| 2004/0152601 A1 * | 8/2004 | Still et al. | 507/100 |
| 2004/0163814 A1 * | 8/2004 | Todd et al. | 166/307 |
| 2004/0214724 A1 * | 10/2004 | Todd et al. | 507/117 |
| 2004/0254079 A1 * | 12/2004 | Frenier et al. | 507/260 |
| 2004/0261996 A1 | 12/2004 | Munoz, Jr. et al. | |
| 2005/0034861 A1 * | 2/2005 | Saini et al. | 166/278 |
| 2005/0034865 A1 * | 2/2005 | Todd et al. | 166/304 |
| 2005/0034868 A1 * | 2/2005 | Frost et al. | 166/307 |
| 2005/0197257 A1 | 9/2005 | Bouwmeester | |
| 2006/0180308 A1 | 8/2006 | Welton et al. | |
| 2006/0180309 A1 | 8/2006 | Welton et al. | |
| 2006/0180310 A1 | 8/2006 | Welton et al. | |
| 2006/0183646 A1 | 8/2006 | Welton et al. | |
| 2006/0254774 A1 * | 11/2006 | Saini et al. | 166/300 |
| 2007/0049501 A1 * | 3/2007 | Saini et al. | 507/260 |
| 2008/0035342 A1 | 2/2008 | Saini et al. | |

FOREIGN PATENT DOCUMENTS

| | | |
|---|---|---|
| FR | EP 0 278 540 | 8/1988 |
| GB | 2 163 790 | 8/1984 |

OTHER PUBLICATIONS

Chatterji, J. and Borchardt, J.K.: "Application of Water-Soluble Polymers in the Oilfield," SPE 9288 (presented at 1980 Annual Technical Conference, Dallas, TX, Sep. 21-24).

Norman, L.R., Conway, M.W., and Wilson, J.M.: "Temperature-Stable Acid Gelling Polymers: Laboratory Evaluation and Field Results," SPE 10260 (presented 1981 Annual Technical Conference, San Antonio, TX, Oct. 5-7).

Office Action from U.S. Appl. No. 11/502,285, Apr. 1, 2008.
Advisory Action dated Jul. 7, 2008 from U.S. Appl. No. 11/502,285.
Office Action mailed Aug. 18, 2008 from U.S. Appl. No. 11/502,285.
Office Action for U.S. Appl. No. 11/502,285, mailed Feb. 3, 2009.
Office Action for U.S. Appl. No. 11/502,285, dated Jul. 8, 2009.
Office Action for U.S. Appl. No. 11/502,285 dated Jun. 29, 2010.
Office Action from U.S. Appl. No. 11/502,285, Aug. 23, 2007.

* cited by examiner

*Primary Examiner* — Shane Bomar
*Assistant Examiner* — Angela M Ditrani
(74) *Attorney, Agent, or Firm* — Robert A. Kent; McDermott Will & Emery LLP

(57) ABSTRACT

Methods of acidizing subterranean formations or well bores, and more specifically, to acidizing systems involving acid-generating fluids that comprise acid-generating compounds and associated methods are provided. An example is a method that comprises: providing an acid-generating fluid that comprises an acid-generating compound; placing the acid-generating fluid into a subterranean formation; and allowing an acid to generate from the acid-generating fluid.

13 Claims, No Drawings

NON-ACID ACIDIZING METHODS AND COMPOSITIONS

CROSS-REFERENCE TO RELATED APPLICATION

This Application is related to U.S. application Ser. No. 11/502,285 entitled "Non-Acid Acidizing Methods and Compositions," filed on Aug. 10, 2006.

BACKGROUND

The present invention relates to methods of acidizing subterranean formations or well bores, and more specifically, to acidizing systems involving acid-generating fluids that comprise acid-generating compounds and associated methods. These acid-generating compounds hydrolyze downhole to form acids that are then used in any suitable acidizing treatment to acidize a portion of a subterranean formation or any damage contained therein. The term "damage" as used herein refers to undesirable deposits in a subterranean formation that may reduce its permeability. Scale, skin, gel residue, and hydrates are contemplated by this term. Also contemplated by this term are geological deposits, such as, but not limited to, carbonates located on the pore throats of the sandstone in a subterranean formation.

Acidizing and fracturing treatments using aqueous acidic solutions commonly are carried out in subterranean formations (including those that contain hydrocarbons as well as those that do not) that are penetrated by well bores to accomplish a number of purposes, one of which may be to increase the permeability of the formation. The resultant increase in formation permeability normally results in an increase in the recovery of hydrocarbons from the formation.

Acidizing techniques may be carried out as "matrix acidizing" procedures or as "acid fracturing" procedures. Generally, in acidizing treatments, aqueous acidic solutions are introduced into the subterranean formation under pressure so that the acidic solution flows into the pore spaces of the formation to remove near-well formation damage and other damaging substances. The acidic solution reacts with acid-soluble materials contained in the formation which results in an increase in the size of the pore spaces and an increase in the permeability of the formation. This procedure commonly enhances production by increasing the effective well radius. When performed at pressures above the pressure required to fracture the formation, the procedure is often referred to as acid fracturing. Fracture-acidizing involves the formation of one or more fractures in the formation and the introduction of an aqueous acidizing fluid into the fractures to etch the fractures' faces whereby flow channels are formed when the fractures close. The aqueous acidizing fluid also enlarges the pore spaces in the fracture faces and in the formation. In fracture-acidizing treatments, one or more fractures are produced in the formation and the acidic solution is introduced into the fracture to etch flow channels in the fracture face. The acid also enlarges the pore spaces in the fracture face and in the formation. The use of the term "acidizing" herein refers to both types of acidizing treatments, and more specifically, refers to the general process of introducing an acid down hole to perform a desired function, e.g., to acidize a portion of a subterranean formation or any damage contained therein.

Although acidizing a portion of a subterranean formation can be very beneficial in terms of permeability, conventional acidizing systems have significant drawbacks. One major problem associated with conventional acidizing treatment systems is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain organic acids, hydrochloric acid or a mixture of hydrofluoric and hydrochloric acids, have high acid strength and quickly react with the formation itself, fines and damage nearest the well bore, and do not penetrate the formation to a desirable degree before becoming spent. To achieve optimal results, it is desirable to maintain the acidic solution in a reactive condition for as long a period of time as possible to maximize the degree of penetration so that the permeability enhancement produced by the acidic solution may be increased.

Another problem associated with acidizing subterranean formations is the corrosion caused by the acidic solution to any metal goods (such as tubular goods) in the well bore and the other equipment used to carry out the treatment. For instance, conventional acidizing fluids, such as those that contain organic acids, hydrochloric acid or a mixture of hydrofluoric and hydrochloric acids, have a tendency to corrode tubing, casing and down hole equipment, such as gravel pack screens and down hole pumps, especially at elevated temperatures. The expense of repairing or replacing corrosion damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. The partial neutralization of the acid results in the production of quantities of metal ions which are highly undesirable in the subterranean formation.

Another problem associated with conventional acidizing systems is that they can pose handling and/or safety concerns due to the reactivity of the acid. For instance, during a conventional acidizing operation, corrosive fumes may be released from the acid as it is injected down the well bore. The fumes can cause an irritation hazard to nearby personnel, and a corrosive hazard to surface equipment used to carry out the operation.

SUMMARY

The present invention relates to methods of acidizing subterranean formations or well bores, and more specifically, to acidizing systems involving acid-generating fluids that comprise acid-generating compounds and associated methods.

In one embodiment, the present invention provides a method comprising: providing an acid-generating fluid that comprises an acid-generating compound; placing the acid-generating fluid into a subterranean formation; and allowing an acid to generate from the acid-generating fluid.

In another embodiment, the present invention provides a method comprising: providing an acid-generating fluid that comprises an acid-generating compound; placing the acid-generating fluid into a subterranean formation; allowing an alcohol to generate from the acid-generating fluid; allowing the alcohol to mix with a fluid in the subterranean formation;

and allowing the surface tension between that fluid and the subterranean formation to be altered.

In another embodiment, the present invention provides a method comprising: providing an acid-generating fluid that comprises an acid-generating compound; placing the acid-generating fluid into a subterranean formation; allowing an alcohol to generate from the acid-generating fluid; and allowing the alcohol to prevent the formation of at least one hydrate.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods of acidizing subterranean formations or well bores, and more specifically, to acidizing systems involving acid-generating fluids that comprise acid-generating compounds and associated methods. These acid-generating compounds hydrolyze down hole to form acids that are then used in any suitable acidizing treatment to acidize a portion of a subterranean formation or any damage contained therein.

The acidizing systems of the present invention should be much less corrosive to tubing, casing, and other down hole equipment than conventional systems, and should achieve deeper penetration into the subterranean formation from the well bore. This should permit corrosion considerations to not be a limiting factor in the design of these acidizing systems. Also, the systems should present little or no acid handling concerns for personnel and equipment, such as some acid resistant equipment. These systems may allow for the pumping of more concentrated acids in some embodiments, especially as compared to common inorganic acid systems. Also, longer effective fracture acidizing lengths should be realized at least in most embodiments. Another benefit may be that leak off may be less as compared to conventional acidic fluids. Next, another benefit may be that little or no corrosion inhibitor will be needed. This will allow the acid treatment under conditions where corrosion inhibition cannot be achieved due to treating conditions or environmental considerations. One of the more important benefits should be that deeper penetration of the acid into the subterranean formation should be obtained. Additionally, in certain embodiments, the acidizing systems of the present invention should effectively generate wormholes to stimulate production in subterranean carbonate formations, dissolve damage, and remove fines to recover production in formations at elevated temperatures.

Another possible benefit of the present invention is that it provides for the delayed generation of hydrofluoric acid through the reaction of an acid-generating compound and any other compound that generates hydrofluoric acid by reacting with the acid-generating compound. Delayed generation of the hydrofluoric acid allows for deeper placement of the hydrofluoric acid within the subterranean formation and alleviates handling and surface exposure concerns often associated with hydrofluoric acid.

The acid-generating fluids of the present invention comprise an acid-generating compound and, optionally, a base fluid. If desired, the acid-generating fluids also may comprise gelling agents, diverting agents, nonemulsifiers, other acids, cross linking agents, and/or mutual solvents. Combinations and derivatives of these also may be suitable. Although some fluid loss control agents may be used if needed, in the fluids of the present invention there should be less need for fluid loss control because the fluids are not involved in a relatively fast reaction at the edge of well bore. This may be application dependent. Any fluid loss may affect the ability to create longer fractures. Any sort of proppant particulates may be included if desired as well.

The fluids of the present invention may further comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, corrosion inhibitors, paraffin inhibitors, asphaltene inhibitors, penetrating agents, clay control additives, iron control additives, chelators, reducers, oxygen scavengers, sulfide scavengers, emulsifiers, foamers, gases, derivatives thereof and combinations thereof, and the like. The fluids may also comprise acids, and hydrogen fluoride generating compounds such as ammonium bifluoride and ammonium fluoride, if desired.

In some embodiments, the acid-generating fluids of the present invention may be in the form of an emulsion made with a suitable emulsifying agent.

The acid-generating compound(s) in the acid-generating fluids of the present invention may be chosen from the group consisting of: poly(ortho esters) and orthoesters. Poly(ortho esters) and ortho esters are thought to be stable at relatively high pH (pH of about 8 or greater) to not rapidly generate acid. Hydrolysis rates are thought to increase with a decreasing pH. Orthoesters have a number of possible forms, and a number of acids can be produced from these materials. Acetic acid and formic acid are possibly the most useful in acidizing applications. Most orthoesters are liquids, and can be made to be water soluble or water insoluble. Similarly poly(ortho esters) may exist in solid or liquid form, and can be made to be water soluble or water insoluble. The liquid forms are preferred for use in this invention. Any substituents groups on the orthoester influence the hydrolysis rates. For instance, a butyl group may yield slower reaction rates than a propyl group, and therefore, may be more useful at higher temperatures. Optionally, the acid-generating compound(s) may include esters; aliphatic polyesters; ortho esters; poly(ortho esters); poly(lactides); poly(glycolides); poly(ε-caprolactones); poly(hydroxybutyrates); poly(anhydrides); aliphatic polycarbonates; poly(amino acids); poly(ethylene oxides); and polyphosphazenes, or copolymers thereof. Derivatives and combinations also may be suitable. Other suitable acid-generating compounds include: formate esters including, but are not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Of these, ethylene glycol monoformate and diethylene glycol diformate may be preferred. Other suitable materials may be disclosed in U.S. Pat. Nos. 6,877,563 and 7,021,383, the disclosures of which are incorporated by reference. Most of these are commercially available in liquid form, and therefore, may be used in that form with or without a base fluid to achieve certain objects of the present invention. Preferably, they are used in this liquid form. However, solid forms of these acid-generating compounds may be used beneficially in the methods of the present invention. They may be useful because they are nondamaging, and may enhance the acidizing treatment. These acid-generating compounds will generate an acid down hole in a delayed fashion that can then acidize the formation. The acid-generating compounds may be reacted with small amounts of reactive materials such as mineral acids, organic acids, acidic anhydrides, p-toluenesulfonic acid, etc. to lower the pH to accelerate the hydrolysis of the acid-generating compound. Similarly, the hydrolysis rate may be slowed by the addition of a small amount of a strong base such as NaOH, $Na_2CO_3$, and $Mg(OH)_2$. The acid-generating compound also may generate alcohols downhole that may be beneficial to the operation.

Preferred acid-generating compounds include ortho esters and poly(ortho esters). One reason why ortho esters and poly(ortho esters) are preferred is that they are thought to generate alcohols down hole, and these alcohols can act as surface tension reducers. These alcohols may be used to clean out condensate blocks, or move or prevent water blocks in the formation. These alcohols may also act as hydrate inhibitors. Delayed generation of these alcohols can be beneficial in other ways as well. For instance, the production of these alcohols downhole may give the distinct advantage of being able to provide the alcohols downhole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. Also, these generated alcohols may be preferred over standard alcohols because some standard alcohols contain chemical inhibitors that may interact with the chemistry within the well bore in such a way as to be problematic. Moreover, shipping and storing standard alcohols may be problematic. The particular alcohol given off depends on the ortho ester or poly(ortho ester) being used. For instance, trimethylorthoformate gives off three molecules of methanol for each molecule of formic acid; the methanol may be useful for hydrate inhibition.

The concentration of the acid-generating compound in the acid-generating fluids of the present invention may range from about 1% to about 100%. The particular concentration used in any particular embodiment depends on what acid-generating compound is being used, and what percentage of acid is generated. Other complex, interrelated factors that may be considered in deciding how much of the acid-generating compound to use include, but are not limited to, the composition of the formation, the temperature of the formation, the pressure of the formation, the particular fines and damage present in the formation (e.g., scale, skin, calcium carbonate, silicates, and the like), the particular acid-generating compound used, the expected contact time of the generated acid with the formation, etc. The desired contact time also depends on the particular application and purpose. For example, if very delayed acidizing is desired, then it may be desirable to pump a dilute, low concentration but a high volume to get deeper penetration. For matrix stimulation treatments, the expected contact time may be determined from the maximum pumping rate that does not cause the down hole pressure to exceed the fracturing pressure. For damage or fines removal procedures, the expected contact time may be based on laboratory tests, but usually should allow for extended contact periods as compared to conventional acid treatments. For instance, in conventional treatments where a live acid is pumped to remove scale or fines, that acid may react instantaneously so clean up of the entire amount of damage and fines may be impossible. Possibly, to achieve an equivalent of a 15% HCl acidizing treatment, it may be desirable to run formate and acetate mixtures, depending on which ones are chosen with an eye toward how resulting salts will be produced in the formation since salts can precipitate in the formation. To avoid undesirable salt precipitation problems, it may be desirable to combine formates and acetates or lactates to keep both below the over saturation concentration that would cause salts to precipitate in formation, but still achieve the acid potential and dissolving power necessary for the job. To choose the appropriate acid-generating compound and the right concentration of that compound, one should balance, inter alia, salt precipitation and acid dissolving power concentration concerns. In some embodiments, a combination of acetic acid and formic acid or a combination of acetic acid and lactic acid may be preferred over a combination of acetic acid and formic acid and lactic acid. One of ordinary skill in the art with the benefit of this disclosure should know how to balance the factors so that salts do not saturate.

If used, the base fluid may be either aqueous-based or oil-based. Preferred base fluids are aqueous-based. Oil-based fluids may be useful in water sensitive formations or for providing an organic acid downhole. A base fluid may be beneficially used, for example, to provide dilution to control concentration or coverage issues. One of ordinary skill in the art with the benefit of this disclosure will recognize when a base fluid may be beneficial. The base fluid should be chosen based on its compatibility with the formation and the acid-generating compound. Some acid-generating compounds are water soluble and some are oil soluble.

Optionally, the acid-generating fluids of the present invention may comprise a gelling agent. In deciding whether to use a gelling agent and which kind to use one should consider at least these factors: the formation temperature, the length of treatment design (time-wise), the desired break mechanism of gelling agent, and the purpose for which the gelling agent has been included in the fluid. One should note that the acid-generating compound may have its own sufficient viscosity or at least some viscosity that should be taken into account when formulating the fluid. It could be the case that the acid-generating compound and the gelling agent could work synergistically, e.g., the generated formate or methanol could stabilize polymers in general, which may be beneficial because the acid may destabilize.

Any gelling agent suitable for use in subterranean applications may be used in these fluids, including, but not limited to, natural biopolymers, synthetic polymers, cross linked gelling agents, viscoelastic surfactants, and the like. A variety of gelling agents may be used, including hydratable polymers that contain one or more functional groups such as hydroxyl, carboxyl, sulfate, sulfonate, amino, or amide groups. Suitable gelling agents typically comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of all of the above. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, combinations thereof, and the like. Examples may be shown in these references, the disclosures of which are incorporated herein by reference, Chatterji, J. and Borchardt, J. K.: "Application of Water-Soluble Polymers in the Oilfield," paper SPE 9288 presented at the 1980 Annual Technical Conference, Dallas, Tex., September 21-24; Norman, L. R., Conway, M. W., and Wilson, J. M.: "Temperature-Stable Acid Gelling Polymers: Laboratory Evaluation and Field Results," paper SPE 10260 presented at the 1981 Annual Technical Conference, San Antonio, Tex., Oct. 5-7; Bouwmeester, Ron, C. M. U.S. Patent Application 2005/0197257; Tackett, Jr., U.S. Pat. No. 5,082,056; Crowe, Curtis, W. European Patent Application 0 278 540; and Nehmer, Warren L GB 2163790. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. If used, a gelling agent may be present in the acid-generating fluids of the present invention in an amount in the range of from about 0.01% to about 5% by weight of the base fluid therein.

To combat possible perceived problems associated with polymeric gelling agents, some surfactants have been used as gelling agents. It is well understood that, when mixed with a fluid in a concentration above the critical micelle concentration, the molecules (or ions) of surfactants may associate to form micelles. These micelles may function, among other purposes, to stabilize emulsions, break emulsions, stabilize a foam, change the wetability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. Moreover, because the viscosifying micelles may be sensitive to pH and hydrocarbons, the viscosity of these viscoelastic surfactant fluids may be reduced after introduction into the subterranean formation without the need for certain types of gel breakers (e.g., oxidizers). This may allow a substantial portion of the viscoelastic surfactant fluids to be produced back from the formation without the need for expensive remedial treatments. A particular surfactant that may be useful is a methyl ester sulfonate ("MES") surfactant. Suitable MES surfactants are disclosed in patent application Ser. Nos. 11/058,475, 11/058,611, 11/058,612, and 11/058,660, the disclosures of which are incorporated by reference. If used, these surfactants may be used in an amount of up to about 10% by weight of the base fluid therein.

While optional, at least a portion of the gelling agent included in the fluids of the present invention may be cross linked by a reaction comprising a cross linking agent, e.g., to further increase the treatment fluid's viscosity thereof. Cross linking agents typically comprise at least one metal ion that is capable of cross linking gelling agent molecules. Really there is an unlimited number of cross linking agents that may be suitable because the compositions of the present invention are not limited by ligand choice on the cross linking agent. Examples of suitable cross linking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum lactate or aluminum citrate); borate compounds (such as, for example, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based cross linking agent is "CL-24™" cross linker from Halliburton Energy Services, Inc., Duncan, Okla. Another example of a suitable cross linking agent is "CL-15," from Halliburton Energy Services, Inc., Duncan Okla. An example of a suitable commercially available titanium-based cross linking agent is "CL-39™" cross linker from Halliburton Energy Services, Inc., Duncan Okla. An example of a suitable borate-based cross linking agent is commercially available as "CL-22™" delayed borate cross linker from Halliburton Energy Services, Inc., Duncan, Okla. Divalent ions also may be used; for example, calcium chloride and magnesium oxide. An example of a suitable divalent ion cross linking agent is commercially available as "CL-30™" from Halliburton Energy Services, Inc., Duncan, Okla. Where present, the cross linking agent generally should be included in the fluids of the present invention in an amount sufficient, among other things, to provide the desired degree of cross linking. In some embodiments, the cross linking agent may be present in the treatment fluids of the present invention in an amount in the range of from about 0.01% to about 5% by weight of the treatment fluid. Buffering compounds may be used if desired, e.g., to delay or control the cross linking reaction. These may include glycolic acid, carbonates, bicarbonates, acetates, phosphates, and any other suitable buffering agent.

One should note that if a gelling agent (especially a cross linked gelling agent) is used, a suitable breaker may be advisable depending on the gelling agent and its interaction with the acid-generating compound, the generated acid, and the well bore conditions. A breaker may be advisable to ultimately reduce the viscosity of the acid-generating fluid. Any breaker suitable for the subterranean formation and the gelling agent may be used. The amount of a breaker to include will depend, inter alia, on the amount of gelling agent present in the treatment fluid. Other considerations regarding the breaker are known to one skilled in the art with the benefit of this disclosure.

In order to insure that the producing zone is contacted by an acid-generating fluid of the present invention uniformly, a particulate solid diverting agent may be placed in the well bore or the formation to isolate the zone of interest. The term "zone" as used herein simply refers to a portion of the formation and does not imply a particular geological strata or composition. One suitable technique involves packing the diverting agent in perforation tunnels extending from the well bore into the subterranean zone. The diverting agent in the perforation tunnels causes the acid-generating fluid introduced therein to be uniformly distributed between all of the perforations whereby the subterranean zone is uniformly treated. The particulate solid diverting agent should be subsequently removed from the perforation tunnel to allow the maximum flow of produced hydrocarbon from the subterranean zone into the well bore. This can be accomplished by contacting the particulate solid diverting agent with a fluid which degrades the diverting agent, such as, water, oil, xylene and the like. Other chemical diverting agents that are suitable for use in this invention include oil-soluble resins, water-soluble rock salts, and emulsions.

Degradable particulate diverting materials are also suitable for use in the present invention. The degradable particulate diverting materials of this invention can be placed in the subterranean zone or packed into perforation tunnels in the subterranean zone by introducing a carrier fluid containing the degradable particulate diverting materials into the subterranean zone. Preferred degradable particulate diverting materials may comprise a degradable material which is capable of degrading over time when placed in a subterranean zone and will not recrystallize or otherwise solidify down hole. The degradable particular diverting materials may need a source of water to degrade and this may be provided by a particulate hydrated organic or inorganic solid compounds introduced into the subterranean formation either before, during or after the degradable particulate diverting material is introduced. Nonlimiting examples of degradable particulates that may be used in conjunction with the compositions and methods of the present invention include but are not limited to degradable polymers. The term "particulate" as used herein is intended to include material particles having the physical shape of platelets, shavings, flakes, ribbons, rods, strips, spheroids, toroids, pellets, tablets or any other physical shape. The terms "degrade," "degradation," "degradable," and the like when used herein refer to both the two relative cases of hydrolytic degradation that the degradable particulate may undergo, i.e., heterogeneous (or bulk erosion) and homogeneous (or surface erosion), and any stage of degradation in between these two. This degradation can be a result of inter alia, a chemical or thermal reaction or a reaction induced by radiation. Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(e-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Of the suitable aliphatic polyesters, poly(lactide) is preferred. The degradable particulate diverting agents may comprise a plasticizer.

In some embodiments, a self-degradable particulate diverting material which degrades over time may be placed in the subterranean zone. The self-degradable particulate diverting material comprises a mixture of a degradable aliphatic polyester and a hydrated organic or inorganic solid compound. A treating fluid may be introduced into the subterranean zone and then diverted by the self-degradable particulate diverting material therein. Thereafter, the degradable aliphatic polyester in the self-degradable particulate diverting material is allowed to at least partially degrade in the releasable water provided by the hydrated organic or inorganic compound which dehydrates over time when heated in the subterranean zone. Examples of the hydrated organic or inorganic solid compounds that can be utilized in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The specific amount of the hydrated compound that may be included will depend upon the presence of formation water, produced fluids, formation temperature, treating fluid and production rates.

Suitable diverting agents may be provided to the subterranean formation via a carrier fluid that then dissipates into the subterranean zone, and as a result the degradable particulate diverting materials is screened out of the carrier fluid by the formation. A variety of carrier fluids can be utilized including, but not limited to, water, brines, seawater or formation water. Of these, in certain embodiments, brines and seawater are preferred.

If a diverting agent is used, the amount used may range up to 3% or more by weight or volume of the carrier fluid. Preferred diverting agents are disclosed in Halliburton's Published U.S. Patent Application No. 2004-0261996-A1, entitled Methods of Diverting Treating Fluids in Subterranean Zones and Degradable Diverting Materials, filed on Jun. 27, 2003 and published on Dec. 30, 2004, the disclosure of which is incorporated by reference.

Mechanical diverting agents may also be suitable. These may include but are not limited to, perf balls, packers, treatment designs, hydrojetting methods, and methods known as SURGIFRAC™ which are available from Halliburton Energy Services, at various locations.

In some embodiments, the fluids of the present invention may include surfactants, e.g., to improve the compatibility of the fluids of the present invention with other fluids (like any formation fluids) that may be present in the well bore or reduce interfacial tension. Using surfactants may be advisable when liquid hydrocarbons are present in the well bore. An artisan of ordinary skill with the benefit of this disclosure will be able to identify the type of surfactant as well as the appropriate concentration of surfactant to be used. Suitable surfactants may be used in a liquid or powder form. Where used, the surfactants are present in the fluids in an amount sufficient to prevent incompatibility with formation fluids or well bore fluids. If included, a surfactant may be added in an amount of from about 1/10th of a gal per 1000 gals up to 10% by volume. Higher concentrations may be used, e.g., if a surfactant gelling agent is used, and these amount may be in excess of 5% in some instances. In an embodiment where liquid surfactants are used, the surfactants are generally present in an amount in the range of from about 0.01% to about 10% by volume of a fluid. In one embodiment, the liquid surfactants are present in an amount in the range of from about 0.1% to about 10% by volume of the fluid. In embodiments where powdered surfactants are used, the surfactants may be present in an amount in the range of from about 0.001% to about 10% by weight of the fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant. It should be noted that it may be beneficial to add a surfactant to a viscosified treatment fluid of the present invention as that fluid is being pumped down hole to help eliminate the possibility of foaming if so desired.

In some embodiments, e.g., those that include a surfactant as described above, mutual solvents may be beneficially employed. Mutual solvents may help keep other additives in solution. Suitable mutual solvents include, but are not limited to, Halliburton's MUSOL® A Mutual Solvent, MUSOL® E Mutual Solvent, ethyleneglycolmonobutylether, and propyleneglycolmonobutylether. Other suitable solvents may include, but are not limited to, water, methanol, isopropyl alcohol, alcohol ethers, aromatic solvents, other hydrocarbons, mineral oils, paraffins, and derivatives and combinations thereof. Other suitable solvents may also be used. If used, the mutual solvent may be included in an amount of from about 1% to 20% by volume, preferably 5% to 10%.

In some embodiments, the fluids of the present invention may contain bactericides, inter alia, to protect both the subterranean formation as well as the fluid from attack by bacteria. Such attacks may be problematic because they may lower the viscosity of the fluid, resulting in poorer performance, for example. Bacteria also can cause plugging by bacterial slime production, and can turn the formation sour. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilopropionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in the viscosified treatment fluid in an amount in the range of from about 0.001% to about 0.003% by weight of the viscosified treatment fluid. Another example of a suitable bactericide is a solution of sodium hypochlorite, commercially available under the tradename "CAT-1™" chemical from Halliburton Energy Services, Inc., of Duncan, Okla. In certain embodiments, such bactericides may be present in the viscosified treatment fluid in an amount in the range of from about 0.01% to about 0.1% by volume of the viscosified treatment fluid. In certain preferred embodiments, when bactericides are used in the viscosified treatment fluids of the present invention, they are added to the viscosified treatment fluid before the gelling agent is added.

If desired, the acid-generating fluids of the present invention may be used in the form of an emulsion. Using an emulsion may be beneficial because it would have inherent viscosity that would control fluid loss. Also, depending on external phase, one could control the rate of reaction with the acid soluble materials in the subterranean formation. For instance, if the external phase of the emulsion is a slower hydrolyzing material, the reaction rate could be slower because of depth of penetration or length of diversion. Another potential benefit is that potential corrosion problems (if any) can be managed, especially by using an oil external phase. Additionally, using an emulsion may enable the pumping and placement of more acid overall, especially at higher temperatures. Another possible benefit is that the emulsion may affect the rate at which the acid is generated by the acid-generating component, which may enable one to control that reaction and the overall system design in a beneficial manner. These emulsions are also good for solids transport. Other benefits and advantages to using emulsions in the methods of the present invention will be evident to one of ordinary skill in the art.

The emulsions in the emulsion embodiments can be made with a suitable surfactant or by blending two acid-generating compounds. For instance, an emulsion can be made between two acid-generating compounds if because one is hydrophobic and one is hydrophilic. For instance, poly(orthoesters) are more hydrophobic, and triethylorthoformate is more hydrophilic. Suitable emulsifying surfactants include nonionic surfactants such as sorbitan esters, AF-61™ Emulsifer, and AF-70™ Emulsifier. For oil external surfactants, AF-61™ Emulsifer and AF-70™ Emulsifier, which are available from Halliburton Energy Services in Duncan, Okla., may be preferred. For water external emulsions, SEM-7™ Emulsifier, WS-36™ Dispersant, and WS-44™ Emulsifier may be preferred. These are available from Halliburton Energy Services in Duncan, Okla. If a surfactant is used, generally an amount from about 0.1% to about 3% based on volume is sufficient. In some embodiments, the emulsion can be mixed and then pumped. In other embodiments, the components can be pumped and then mixed down hole.

In some embodiments, the acid-generating fluids of the present invention can be prepared in any suitable tank equipped with suitable mixing means well known to those skilled in the art. The fluids may be transferred either at a controlled rate directly into the well bore or into a convenient storage tank for injection down the well bore. In either event, the pumping rates and pressures utilized will depend upon the characteristics of the formation and whether or not fracturing of the formation is desired. After an acid-generating fluid has been injected into a well bore, the well may be shut in and allowed to stand for a period of several hours or more depending on the type of acid-generating compound employed and the formation treated. If there is pressure in the well, pressure then can be released and then the spent or at least partially spent acid-generating fluid (that likely contains salts formed by the reaction of the acid in the subterranean formation), may be permitted to flow back to the surface for appropriate disposal. The well then can be placed on production or used for other purposes.

In some embodiments, if treating a condensate bank in a formation, the preferred option may be to run a non-aqueous acid-generating compound (maybe with no solvent).

In certain embodiments of the methods of the present invention, the methods may comprise: providing an acid-generating fluid that comprises an acid-generating compound, placing the acid-generating fluid in a well bore penetrating a subterranean formation; and allowing the acid-generating compound to produce an acid that then acidizes at least a portion of the formation or damage contained therein. The acid-generating fluid may be placed in a well bore penetrating a subterranean formation at above or below the fracture gradient of the formation, depending on the desired use or purpose.

The compositions and methods of the present invention may be used in matrix acidizing applications, acidizing applications, fracture acidizing applications, scale removal applications, damage removal applications, hydrate treatment applications, and hydrate inhibition applications. They may also be used in open hole diversion applications. Other purposes may also be applicable including those that involve the generation of an acid and/or an alcohol downhole.

To facilitate a better understanding of the present invention, the following examples of certain aspects of some embodiments are given. In no way should the following examples be read to limit, or define, the entire scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing an acid-generating fluid that comprises an acid-generating compound that comprises at least one acid-generating compound selected from the group consisting of: a poly(ortho ester); an orthoester; a poly (glycolide); a poly($\epsilon$-caprolactone); a poly (hydroxybutyrate); a poly(anhydride); an aliphatic polycarbonate; a poly(amino acid); a poly(ethylene oxide); a polyphosphazene; a derivative thereof; and a combination thereof; and a pH-adjusting agent, wherein the pH-adjusting agent controls the hydrolysis rate of the acid generating compound;
placing the acid-generating fluid into a subterranean formation, wherein the acid-generating compound present in the acid-generating fluid is in liquid form;
allowing an acid and an alcohol to generate from the acid-generating fluid;
allowing the alcohol to mix with a fluid in the subterranean formation; and
allowing the surface tension between that fluid and the subterranean formation to be altered.

2. The method of claim 1 wherein the acid-generating fluid comprises a base fluid that is an aqueous-based fluid or non-aqueous fluid.

3. The method of claim 1 wherein the acid-generating fluid comprises at least one additive selected from the group consisting of: a gelling agent; a diverting agent; a nonemulsifier; an acid; a cross linking agent; a mutual solvent; a fluid loss control agent; a pH buffer; an oxidizing agent; an enzyme; a lost circulation material; a scale inhibitor; a surfactant; a clay stabilizer; a corrosion inhibitor; a paraffin inhibitor; an asphaltene inhibitor; a penetrating agent; a clay control additive; an iron control additive; a chelator; a reducer; an oxygen scavenger; a sulfide scavenger; an emulsifier; a foamer; a gas; a diverting agent; a bactericide; a hydrogen fluoride generating compound; ammonium bifluoride; ammonium fluoride; and any derivative thereof.

4. The method of claim 1 wherein the acid-generating fluid is an emulsion.

5. The method of claim 1 wherein the acid-generating fluid comprises a strong base to delay the hydrolysis of the acid-generating compound or a reactive material to accelerate the hydrolysis of the acid-generating compound.

6. A method comprising:
providing an acid-generating fluid that comprises an acid-generating compound that comprises at least one acid-generating compound selected from the group consisting of: a poly(ortho ester); an orthoester; a poly($\epsilon$-caprolactone); a poly(hydroxybutyrate); a poly (anhydride); an aliphatic polycarbonate; a poly(amino acid); a poly(ethylene oxide); a polyphosphazene; a derivative thereof; and a combination thereof, wherein the acid-generating fluid does not comprise particulates; and a pH-adjusting agent, wherein the pH-adjusting agent controls the hydrolysis rate of the acid generating compound;
placing the acid-generating fluid into a subterranean formation, wherein the acid-generating compound present in the acid-generating fluid is in liquid form;
allowing an acid and an alcohol to generate from the acid-generating fluid;
allowing the alcohol to mix with a fluid in the subterranean formation; and
allowing the surface tension between that fluid and the subterranean formation to be altered.

7. The method of claim 6 wherein the acid-generating fluid comprises a base fluid that is an aqueous-based fluid or non-aqueous fluid.

8. The method of claim 6 wherein the acid-generating fluid comprises at least one additive selected from the group consisting of: a gelling agent; a diverting agent; a nonemulsifier; an acid; a cross linking agent; a mutual solvent; a fluid loss control agent; a pH buffer; an oxidizing agent; an enzyme; a lost circulation material; a scale inhibitor; a surfactant; a clay stabilizer; a corrosion inhibitor; a paraffin inhibitor; an asphaltene inhibitor; a penetrating agent; a clay control additive; an iron control additive; a chelator; a reducer; an oxygen scavenger; a sulfide scavenger; an emulsifier; a foamer; a gas; a diverting agent; a bactericide; a hydrogen fluoride generating compound; ammonium bifluoride; ammonium fluoride; and any derivative thereof.

9. The method of claim 6 wherein the acid-generating fluid is an emulsion.

10. The method of claim 6 wherein the acid-generating fluid comprises a strong base to delay the hydrolysis of the acid-generating compound or a reactive material to accelerate the hydrolysis of the acid-generating compound.

11. A method comprising:
providing an acid-generating fluid, wherein the acid-generating fluid is an emulsion that comprises an acid-generating compound that comprises at least one acid-generating compound selected from the group consisting of: a poly(ortho ester); an orthoester; an aliphatic polyester; a poly(lactide); a poly(glycolide); a poly($\epsilon$-caprolactone); a poly(hydroxybutyrate); a poly(anhydride); an aliphatic polycarbonate; a poly(amino acid); a poly(ethylene oxide); a polyphosphazene; a formate ester; ethylene glycol monoformate; ethylene glycol diformate; diethylene glycol diformate; glyceryl monoformate; glyceryl diformate; glyceryl triformate; triethylene glycol diformate; a formate ester of pentaerythritol; a derivative thereof; and a combination thereof; and a pH-adjusting agent, wherein the pH-adjusting agent controls the hydrolysis rate of the acid generating compound;
placing the acid-generating fluid into a subterranean formation, wherein the acid-generating compound is in liquid form; and
allowing an acid and an alcohol to generate from the acid-generating fluid, allowing the alcohol to mix with a fluid in the subterranean formation; and allowing the surface tension between that fluid and the subterranean formation to be altered.

12. The method of claim 11 wherein the acid-generating fluid comprises at least one additive selected from the group consisting of: a gelling agent; a diverting agent; a nonemulsifier; an acid; a cross linking agent; a mutual solvent; a fluid loss control agent; a pH buffer; an oxidizing agent; an enzyme; a lost circulation material; a scale inhibitor; s surfactant; a clay stabilizer; a corrosion inhibitor; a paraffin inhibitor; an asphaltene inhibitor; a penetrating agent; a clay control additive; an iron control additive; a chelator; a reducer; an oxygen scavenger; a sulfide scavenger; an emulsifier; a foamer; a gas; a diverting agent; a bactericide; a hydrogen fluoride generating compound; ammonium bifluoride; ammonium fluoride; and any derivative thereof.

13. The method of claim 11 wherein the acid-generating fluid comprises a strong base to delay the hydrolysis of the acid-generating compound or a reactive material to accelerate the hydrolysis of the acid-generating compound.

\* \* \* \* \*